(12) United States Patent
Kita

(10) Patent No.: US 9,658,521 B2
(45) Date of Patent: May 23, 2017

(54) ILLUMINATION DEVICE AND IMAGE DISPLAY APPARATUS

(71) Applicant: Sony Corporation, Tokyo (JP)

(72) Inventor: Koji Kita, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/335,023

(22) Filed: Oct. 26, 2016

(65) Prior Publication Data

US 2017/0045811 A1 Feb. 16, 2017

Related U.S. Application Data

(63) Continuation of application No. 15/073,886, filed on Mar. 18, 2016, which is a continuation of application (Continued)

(30) Foreign Application Priority Data

Jun. 18, 2010 (JP) ................................ P2010-139175

(51) Int. Cl.
*G02B 21/20* (2006.01)
*F21V 9/16* (2006.01)
(Continued)

(52) U.S. Cl.
CPC .............. *G03B 21/204* (2013.01); *F21V 5/04* (2013.01); *F21V 9/14* (2013.01); *F21V 9/16* (2013.01);
(Continued)

(58) Field of Classification Search
CPC . G03B 21/204; G03B 21/2033; H04N 9/3161
(Continued)

(56) References Cited

U.S. PATENT DOCUMENTS 7,445,340 B2 11/2008 Conner et al.
8,678,596 B2 3/2014 Sakata et al.
(Continued)

FOREIGN PATENT DOCUMENTS

CN 101361022 A 2/2009
CN 101498401 A 8/2009
(Continued)

OTHER PUBLICATIONS

Office Action from Japanese Application No. 2010-139175, dated May 13, 2014.
(Continued)

*Primary Examiner* — William C Dowling
*Assistant Examiner* — Ryan Howard
(74) *Attorney, Agent, or Firm* — Lerner, David, Littenberg, Krumholz & Mentlik, LLP

(57) ABSTRACT

An illumination device includes: an excitation light source that emits excitation light having a first wavelength; and a fluorescent member that includes a fluorescent substance that, when it is irradiated with the excitation light, emits light having a second wavelength longer than the first wavelength, transmits a part of the excitation light and reflects another part of the excitation light, and a first reflective film provided at a side of the fluorescent substance, which is opposite to an excitation light incidence side, the fluorescent member emitting multiplexed light including an excitation light component reflected from the fluorescent substance and the first reflective film and a light component emitted from the fluorescent substance.

30 Claims, 5 Drawing Sheets

Related U.S. Application Data

No. 14/334,014, filed on Jul. 17, 2014, now Pat. No. 9,323,046, which is a continuation of application No. 13/155,468, filed on Jun. 8, 2011, now Pat. No. 8,820,940.

(51) Int. Cl.

| | | |
|---|---|---|
| *G03B 21/20* | (2006.01) | |
| *F21V 9/14* | (2006.01) | |
| *F21V 13/08* | (2006.01) | |
| *F21V 14/08* | (2006.01) | |
| *F21V 5/04* | (2006.01) | |
| *F21Y 115/30* | (2016.01) | |
| *F21Y 115/10* | (2016.01) | |
| *G02B 27/28* | (2006.01) | |

(52) U.S. Cl.
CPC ............. *F21V 13/08* (2013.01); *F21V 14/08* (2013.01); *G03B 21/2073* (2013.01); *F21Y 2115/10* (2016.08); *F21Y 2115/30* (2016.08); *G02B 27/283* (2013.01)

(58) Field of Classification Search
USPC ........... 313/483, 501; 348/743; 362/84, 231; 250/484.2, 484.4
See application file for complete search history.

(56) References Cited

U.S. PATENT DOCUMENTS

| | | |
|---|---|---|
| 8,820,940 B2 | 9/2014 | Kita |
| 9,323,046 B2 | 4/2016 | Kita |
| 2005/0134812 A1 | 6/2005 | Akiyama |
| 2006/0139574 A1 | 6/2006 | Ralli et al. |
| 2007/0206164 A1 | 9/2007 | Beeson et al. |
| 2009/0034284 A1 | 2/2009 | Li et al. |
| 2010/0220298 A1 | 9/2010 | Wang et al. |
| 2010/0245777 A1 | 9/2010 | Ogura |
| 2011/0149549 A1 | 6/2011 | Miyake |

FOREIGN PATENT DOCUMENTS

| | | |
|---|---|---|
| JP | 2004327361 A | 11/2004 |
| JP | 2005347263 A | 12/2005 |
| JP | 2005352187 A | 12/2005 |
| JP | 2006047903 A | 2/2006 |
| JP | 2006343721 A | 12/2006 |
| JP | 2009521786 A | 6/2009 |
| JP | 2009245712 A | 10/2009 |
| JP | 2010-086815 A | 4/2010 |
| JP | 2011129354 A | 6/2011 |
| JP | 2011129406 A | 6/2011 |
| JP | 2011197212 A | 10/2011 |

OTHER PUBLICATIONS

Office Action from Chinese Application No. 2011-10157759.7, dated Aug. 25, 2014.

JP Office Action for Application No. 2010139175, dated Nov. 4, 2014.

Japanese Office Action for JP Application No. 2010139175, dated Mar. 3, 2015.

Chinese Office Action for Application No. 201510279240.4 dated Mar. 31, 2016.

Japanese Office Action for Application No. 2015-127493 dated Jul. 5, 2016.

Japanese Office Action for Application No. 2016-172604 dated Mar. 14, 2017.

CONFIGURATION EXAMPLE OF IMAGE DISPLAY APPARATUS

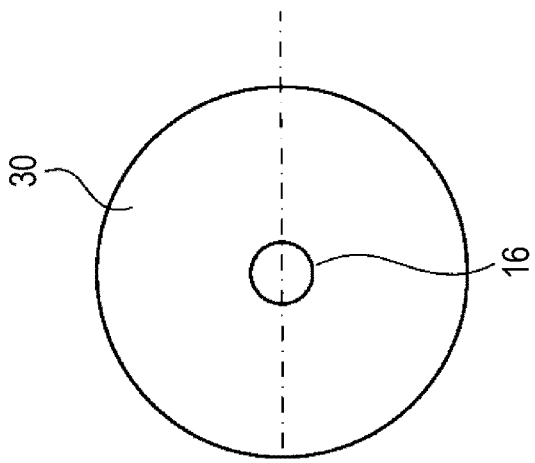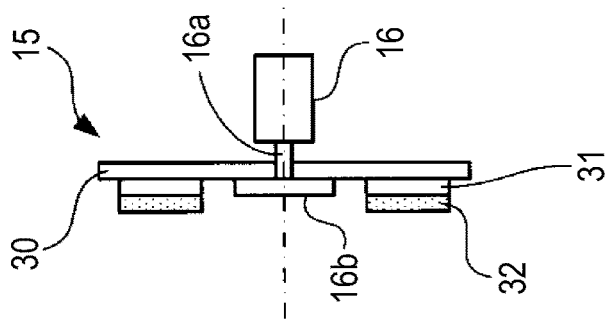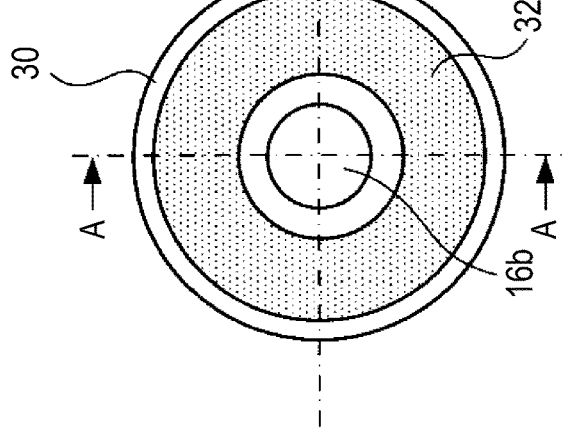

CONFIGURATION EXAMPLE OF REFLECTIVE FILM

SPECTRAL CHARACTERISTIC OF POLARIZATION BEAM SPLITTER

OPERATION OF POLARIZATION SPLITTER

SPECTRAL CHARACTERISTIC OF EMITTED LIGHT

CONFIGURATION OF SPECTRAL OPTICAL SYSTEM OF MODIFIED EXAMPLE 1

ILLUMINATION DEVICE AND IMAGE DISPLAY APPARATUS

CROSS-REFERENCE TO RELATED APPLICATION

The present application is a continuation U.S. patent application Ser. No. 15/073,886, filed Mar. 18, 2016 which is a continuation of U.S. patent application Ser. No. 14/334,014, filed Jul. 17, 2014 which is a continuation of U.S. patent application Ser. No. 13/155,468, filed Jun. 8, 2011 (U.S. Pat. No. 8,820,940), which claims priority from Japanese Patent Application No. JP 2010-139175 filed in the Japanese Patent Office on Jun. 18, 2010, the entire content of which is incorporated herein by reference.

BACKGROUND OF THE INVENTION

Field of the Invention

The invention relates to an illumination device and an image display apparatus, and more particularly, to an illumination device used as a light source of a projection type image display apparatus such as a projector, and an image display apparatus including the illumination device.

Description of the Related Art

In recent years, in regard to watching movies at home, a presentation at a meeting, or the like, the opportunities to use a projection-type image display apparatus, such as a projector, have been increasing. In such a projector, as a light source, for example, a discharge type lamp, such as mercury lamp, having a high brightness is generally used. In addition, with the recent progress in the development techniques for solid-state light emitting devices (for example, semiconductor lasers, light emitting diodes, or the like), there has been also suggested a projector using the solid-state light emitting device (for example, see JP-A-2010-86815).

The projector disclosed in JP-A-2010-86815 is a DLP (Digital Light Processing: registered trademark) type projector. In such a type of projector, images are displayed in full color through a time division display of approximately several thousand times per second for the different colors. Therefore, in the projector of JP-A-2010-86815, a red color light-emitting device, a green color light emitting device, and a blue color light emitting device those utilizing the solid-state light emitting device are separately prepared, and emitted light from each light-emitting device is time-divisionally controlled, and is emitted to the outside to display image light.

In addition, each of the light emitting devices, which are used in the projector of JP-A-2010-86815, includes a light emitting wheel that is rotatably driven, a light emitting material that is formed on a surface of the light emitting wheel and absorbs excitation light and emits light of a predetermined color, and an excitation light source (solid-state light emitting device) that emits excitation light. In addition, as the excitation light source used in each of the light emitting devices, a light source that emits excitation light with a wavelength band shorter than that of light emitted from the light emitting material is used.

SUMMARY OF THE INVENTION

As described above, a projector not using a mercury lamp has been suggested in the related art, and in such a projector, it is possible to realize a mercury-free projector in response to recent environment problems. In addition, in a case where for example, a solid-state light emitting device such as a semiconductor laser and a light-emitting diode is used as a light source, it has an advantage that durability is longer and a decrease in brightness is also lower compared to a mercury lamp.

However, the technique suggested in JP-A-2010-86815 is only applicable to a light source device (illumination device), for example, a DLP (registered trademark) type projector or the like that time-divisionally emits plural kinds of single color light having wavelengths differing from each other. The technology suggested in JP-A-2010-86815 may be not applicable to application where a light source device emitting white light is necessary, like an image display device such as a 3 LCD (Light Crystal Display) type projector or the like.

Thus, it is desirable to provide a mercury-free illumination device that is also applicable to various applications such as a 3 LCD type projector and an image display apparatus having the illumination device.

An illumination device according to an embodiment of the invention includes an excitation light source that emits excitation light having a first wavelength and a fluorescent member. The fluorescent member includes a fluorescent substance that, when it is irradiated with the excitation light, emits light having a second wavelength longer than the first wavelength, transmits a part of the excitation light and reflects another part of the excitation light, and a first reflective film provided at a side of the fluorescent substance, which is opposite to an excitation light incidence side. The fluorescent member emits multiplexed light including an excitation light component reflected from the fluorescent substance and the first reflective film, and a light component emitted from the fluorescent substance. In addition, the above-described "wavelength" means a wavelength including not only a single wavelength but also a predetermined wavelength band.

In addition, an image display apparatus according to another embodiment of the invention includes a light source device section and an image projection section, and a function of each section is as follows. The light source device section has substantially the same configuration as that of the illumination device according to the embodiment of the invention. The image projection section generates a predetermined image light by using the multiplexed light emitted from the light source device section and projects the generated image light to the outside.

According to the embodiment of the invention, the illumination device (light source device section) emits the multiplexed light including the excitation light with a second wavelength that is emitted from the fluorescent substance and a part of the excitation light with a first wavelength that is reflected from the fluorescent substance and the first reflective film. That is, according to the embodiment of the invention, light having a wavelength band different from that of the excitation light and the emission light is emitted. Therefore, according to the embodiment of the invention, in a case where the excitation light is set as blue light and the emission light is set as light (for example, yellow light or the like) including both red light and green light, it is possible to emit white light from the illumination device (light source device section).

As described above, in the illumination device (light source device section) according to the embodiment of the invention, it is possible to emit light having a wavelength band different from that of the excitation light and the emission light, and by appropriately setting a combination of the first wavelength of the excitation light and the second wavelength of the emission light, it is possible to emit white light or the like. Therefore, according to the embodiment of the invention, it is possible to provide a mercury-free illumination device that is also applicable to various applications such as a 3 LCD type projector and an image display apparatus having the illumination device.

BRIEF DESCRIPTION OF THE DRAWINGS

FIGS. 2A to 2C are schematic configuration diagrams illustrating a fluorescent member used for a light source device section (illumination device);

DESCRIPTION OF THE PREFERRED EMBODIMENTS

Hereinafter, description will be given to an example of an illumination device and an image display apparatus having the same according to an embodiment of the invention with reference to accompanying drawings in the following order. In addition, in this embodiment, a 3 LCD type projector is described as an example of the image display apparatus, but the invention is not limited thereto. The invention may be applied to any image display apparatus where white light is necessary and the same effect may be obtained.

1. Configuration Example of Image Display Apparatus
2. Configuration Example of Light Source Device Section (illumination device)
3. Configuration Example of Fluorescent Member
4. Configuration Example of Polarization Beam Splitter
5. Operation Example of Light Source Device Section
6. Various Modified Examples

1. CONFIGURATION EXAMPLE OF IMAGE DISPLAY APPARATUS

Figure 1:
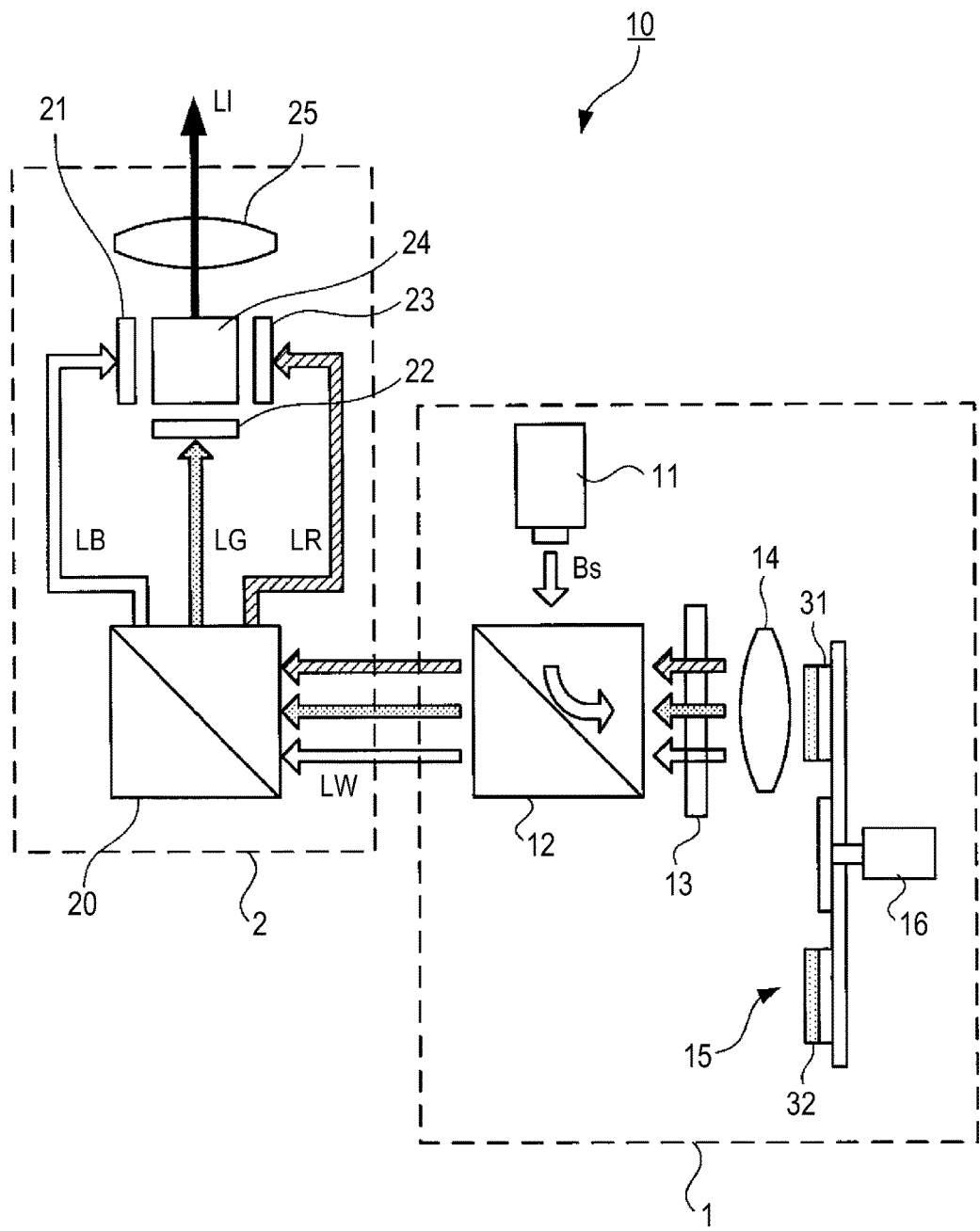
FIG. 1 is a schematic block configuration diagram illustrating an image display apparatus according to an embodiment of the invention.

FIG. 1 shows a configuration example of an image display apparatus according to an embodiment of the invention. In FIG. 1, for simplicity of explanation, only main portions that are operated when image light is projected to the outside in the image display apparatus 10 of this embodiment are mainly shown. In addition, in FIG. 1, a configuration example of a 3 LCD type projector is shown, but the invention is not limited thereto. The invention may be applied to a 3 LCD type projector using a reflection-type LCD light modulation device.

The image display apparatus 10 includes a light source device section 1 (illumination device) and an optical engine section 2 (image projecting section). In addition, a configuration of the light source device section 1 will be described later.

The optical engine section 2 optically processes light (white light LW in this example) emitted from the light source device section 1 to generate image light LI, and magnifies and projects the image light LI to, for example, an external screen. The optical engine section 2 includes, for example, a spectral optical system 20, a 3 LCD optical modulation device (hereinafter, referred to as "a first LCD panel 21 to third LCD panel 23", respectively), a prism 24, and a projection optical system 25. In addition, the configuration of the optical engine section 2 is not limited to an example shown in FIG. 1 and may be appropriately changed, for example, according to usage or the like. For example, various necessary optical devices may be appropriately disposed on an optical path between each of components inside the optical engine section 2.

In addition, in the optical engine section 2 of this example, the first and third LCD panels 21 and 23 are disposed with light emitting surfaces thereof opposed to each other, and the second LCD panel 22 is disposed in a direction orthogonal to an opposing direction of the first and third LCD panels 21 and 23. The prism 24 is disposed at a region encompassed by the first to third LCD panels 21 to 23. In addition, in this example, the projection optical system 25 is disposed at a position opposing a light emitting surface of the second LCD panel 22 with the prism 24 interposed therebetween. In addition, the spectral optical system 20 is provided at a light incident side of the first to third LCD panels 21 to 23.

The spectral optical system 20 is configured by, for example, a dichroic mirror, a reflective mirror or the like, disperses white light LW incident from the light source device section 1 into blue light LB, green light LG and red light LR and emits light of each wavelength component to each corresponding LCD panel. In this example, the spectral optical system 20 emits each of the dispersed blue light LB, green light LG and red light LR to the first LCD panel 21, the second LCD panel 22 and the third LCD panel 23, respectively. In addition, in this embodiment, in the spectral optical system 20, a polarization direction of each wavelength component is adjusted to be a predetermined direction.

Each of the first to third LCD panels 21 to 23 is configured by a transmissive LCD panel. Each of the LCD panels transmits or shields (modulates) the incident light with a liquid crystal cell unit by changing an arrangement of liquid crystal molecules enclosed in a liquid crystal cell (not shown) on the basis of a driving signal supplied from a panel drive section (not shown). Each of the LCD panels emits the modulated light of a predetermined wavelength (modulated light) to the prism 24.

The prism 24 multiplexes the modulated light of each wavelength component incident from the first to third LCD panels 21 to 23, respectively, and emits the multiplexed light, that is, image light LI to the projection optical system 25.

The projection optical system 25 magnifies and projects the image light incident from the prism 24 onto a display surface of, for example, an external screen or the like.

2. CONFIGURATION EXAMPLE OF LIGHT SOURCE DEVICE SECTION 1

Next, an internal configuration of the light source device section 1 of this embodiment will be described with reference to FIG. 1. The light source device section 1 includes an excitation light source 11, a polarization beam splitter 12 (a spectral optical system), a quarter wavelength plate 13, a condensing optical system 14 (optical system), a fluorescent member 15, and a motor 16 (driving unit).

In the light source device section 1 of this embodiment, a reflective film 31 and a fluorescent layer 32, which are described later, of the fluorescent member 15, the condensing optical system 14, the quarter wavelength plate 13 and the polarization beam splitter 12 are disposed on an optical path of emitted light from the fluorescent member 15 in this order from the fluorescent member 15 side. In addition, the excitation light source 11 is disposed in a direction orthogonal to the optical path of the emitted light from fluorescent member 15 and at a location opposing one light incident surface of the polarization beam splitter 12.

The excitation light source 11 is configured by a solid-state light emitting device that emits light of a predetermined wavelength (a first wavelength). In this example, as the excitation light source 11, a blue laser emitting blue light (excitation light Bs) with a wavelength of 445 nm is used. In addition, excitation light Bs of linear polarization light (S polarization light) is emitted from the excitation light source 11. In addition, in this embodiment, a wavelength of the excitation light is set to a wavelength shorter than that of light (hereinafter, referred to as "emission light") emitted from the fluorescent layer 32 that is described later, in the fluorescent member 15.

In addition, in a case where the excitation light source 11 is configured by a blue laser, it may be configured to obtain excitation light Bs with a predetermined output by one blue laser, and it may be configured to multiplex emitted light from each of plural blue lasers and obtain excitation light Bs with a predetermined output. In addition, a wavelength of the blue light (excitation light Bs) is not limited to 445 nm, and it is possible to use any wavelength as long as the wavelength is within a wavelength band of light called blue light.

The polarization beam splitter 12 (PBS) separates excitation light Bs incident from the excitation light source and emitted light (multiplexed light) incident from the fluorescent member 15. Specifically, the polarization beam splitter 12 reflects the excitation light Bs incident from the excitation light source 11 and emits the reflected light to the fluorescent member 15 via the condensing optical system 14. In addition, the polarization beam splitter 12 transmits light emitted from the fluorescent member 15 and emits the transmitted light to the spectral optical system 20 in the optical engine section 2.

In this embodiment, a spectral characteristic of the polarization beam splitter 12 is designed to realize the above-described light separating operation in the polarization beam splitter 12. In addition, a specific example of the spectral characteristic of the polarization beam splitter 12 will be described later. In addition, as a configuration of an optical system that separates the excitation light Bs incident from the excitation light source 11 and the emitted light from the fluorescent member 15, it is not limited to the polarization beam splitter 12 and any optical system may be used as long as it is configured to perform the above-described light separating operation.

The quarter wavelength plate 13 is a phase element that generates a phase difference of $\pi/2$ with respect to the incident light. In a case where the incident light is linearly polarized light, the quarter wavelength plate 13 converts the linearly polarized light to circularly polarized light. In a case where the incident light is circularly polarized light, the quarter wavelength plate 13 converts the circularly polarized light to linearly polarized light. In this embodiment, the quarter wavelength plate 13 converts a linearly polarized excitation light emitted from the polarization beam splitter 12 to circularly polarized excitation light and converts a circularly polarized excitation light component included in the multiplexed light emitted from the fluorescent member 15 to linearly polarized light.

The condensing optical system 14 condenses the excitation light emitted from the quarter wavelength plate 13 to have a predetermined spot diameter, and emits the condensed excitation light (hereinafter, referred to as "condensed light") to the fluorescent member 15. In addition, the condensing optical system 14 converts the multiplexed light emitted from the fluorescent member 15 into parallel light and emits the parallel light to the quarter wavelength plate 13. In addition, the condensing optical system 14 may be configured by, for example, a single collimator lens or may be configured to convert incident light into parallel light by using plural lenses.

The fluorescent member 15 absorbs a part of the excitation light (blue light) incident through the condensing optical system 14, emits light with a predetermined wavelength band (a second wavelength) and reflects the remainder of the excitation light. The fluorescent member 15 multiplexes the emission light and a part of the excitation light that is reflected and emits the multiplexed light to the condensing optical system 14.

In this example, since light incident to the optical engine section 2 is set as white light LW, the fluorescent member 15 emits light in a wavelength band (approximately 480 to 680 nm) including red light and green light. In this embodiment, the emission light in a wavelength band including red light and green light and a part of the excitation light (blue light) that is reflected by the fluorescent member 15 (a reflective film 31 and a fluorescent layer 32 that are described later) are multiplexed and white light is generated. In addition, a more detailed configuration of the fluorescent member 15 will be described later.

In addition, since the emission light emitted from the fluorescent member 15 is light that expands in a Lambertian (uniform diffusion) shape, when the distance between the condensing optical system 14 and the fluorescent member 15 is long, it is difficult to sufficiently condense the emission light through the condensing optical system 14, and thereby usage efficiency of excitation light decreases. In addition, when the spot diameter of the excitation light emitted to the fluorescent member 15 is oversized, expansion of the emission light becomes larger and thereby the usage efficiency decreases. Therefore, in this embodiment, the configuration of the condensing optical system 14 such as lens configuration, focal point distance and alignment position, and the distance between the condensing optical system 14 and the fluorescent member 15 are set so as to obtain sufficient usage efficiency of excitation light.

The motor 16 rotatably drives the fluorescent member 15 for a predetermined number of rotations. At this time, the motor 16 drives the fluorescent member 15 so that the fluorescent member 15 rotates in a plane (an irradiation plane of the excitation light of the fluorescent layer 32) orthogonal to the irradiation direction of the excitation light. Due to this, the irradiation position of the excitation light in the fluorescent member 15 varies (moves) with the passage of time at a speed corresponding to the number of rotations in a plane orthogonal to the irradiation direction of the excitation light.

As described above, the fluorescent member 15 is rotatably driven by the motor 16 and the irradiation position of the excitation light in the fluorescent member 15 varies with the passage of time, such that it is possible to suppress an increase in the temperature at the irradiation position and it is possible to prevent the light emission efficiency of the fluorescent layer 32 from being decreased. In addition, it takes some (for example, several nsec) for fluorescent atoms to absorb the excitation light and to emit light, and even when the next excitation light is emitted to the fluorescent atoms for the excitation period, the atoms do not emit light. However, according to this embodiment, the irradiation position of the excitation light in the fluorescent member 15 varies with the passage of time, such that the fluorescent atoms not excited are sequentially disposed at the irradiation position of the excitation light and thereby it is possible to allow the fluorescent layer 32 to efficiently emit light.

In addition, in this embodiment, an example where the fluorescent member 15 is rotatably driven by the motor 16 is illustrated. However, the invention is not limited thereto and may be configured in any manner as long as the irradiation position of the excitation light in the fluorescent member 15 varies with the passage of time. For example, the irradiation position of the excitation light may vary with the passage of time by making the fluorescent member 15 lineally reciprocate in a predetermined direction in a plane orthogonal to the irradiation direction of the excitation light. In addition, the irradiation position of the excitation light may vary with the passage of time by fixing the fluorescent member 15 and by relatively moving the excitation light source 11 and various optical systems with respect to the fluorescent member 15.

3. CONFIGURATION EXAMPLE OF FLUORESCENT MEMBER

Next, a detailed configuration of the fluorescent member 15 will be described with reference to FIGS. 2A to 2C. In addition, FIG. 2A shows a front view of the fluorescent member 15 seen from the condensing optical system 14 side, FIG. 2B shows a cross sectional view taken along a line A-A of FIG. 2A, and FIG. 2C shows a front view of the fluorescent member 15 seen from a side opposite to the condensing optical system 14.

The fluorescent member 15 includes a disk-shaped substrate 30, a reflective film 31 (a first reflective film) formed on one surface (incidence side of excitation light) of the substrate 30 and the fluorescent layer 32 (fluorescent substance).

The substrate 30 is formed from a transparent material such as glass and transparent resin. In addition, the material for forming the substrate 30 is not limited to a transparent material and may be formed from any material as long as the material has a predetermined strength. In addition, a size such as the thickness of the substrate 30 is appropriately set in consideration of the necessary strength, weight or the like. In addition, the center of the substrate 30 is attached to a rotational shaft 16a of the motor 16 and the substrate 30 is fixed to the rotational shaft 16a by a fixing hub 16b.

As shown in FIG. 2A, the reflective film 31 is formed on one surface of the substrate 30 with a doughnut shape. The doughnut-shaped reflective film 31 is disposed on the substrate 30 in a manner such that the reflective film 31 and the substrate 30 are concentric to each other. In addition, a width of the reflective film 31 in the radial direction thereof is set to a value larger than the spot size of the excitation light (condensed light) condensed by the condensing optical system 14.

The reflective film 31 reflects the entire light regardless of a wavelength and an incidence angle of incident light. Therefore, the reflective film 31 not only reflects the light (emission light) excited at the fluorescent layer 32 to the condensing optical system 14 side, but also reflects a part of the excitation light (blue light) transmitted through the fluorescent layer 32 to the condensing optical system 14 side.

Figure 3:
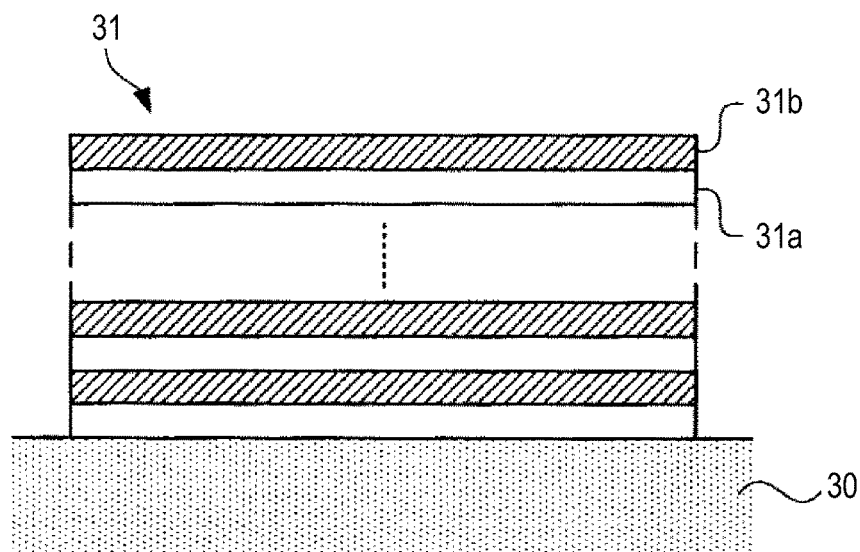
FIG. 3 is a view illustrating a configuration example of a reflective film used in a fluorescent member.

Here, FIG. 3 shows one configuration example of the reflective film 31. The reflective film 31 is formed by alternately laminating a first dielectric layer 31a formed from, for example, a SiO2 layer, a MgF2 layer or the like and a second dielectric layer 31b formed from, for example, a TiO2 layer, a Ta2O3 layer or the like on the substrate 30. Specifically, the reflective film 31 may be configured by a dichroic mirror (dichroic film). In a case where the reflective film 31 is configured by a dichroic mirror as shown in FIG. 3, by the adjustment of a lamination count of each dielectric layer, the thickness of each dielectric layer, a forming material of each dielectric layer, or the like, it is possible to set a reflective (transmissive) characteristic of the reflective layer 31 to a predetermined characteristic. In addition, the lamination count of each of the first dielectric layer 31a and the second dielectric layer 31b may generally be several layers to several tens of layers. In addition, the first dielectric layer 31a and the second dielectric layer 31b are formed by, for example, a vapor-deposition method, a sputtering method or the like. In addition, the configuration of the reflective film 31 is not limited to the example shown in FIG. 3, and may be formed from, for example, a metal film such as aluminum.

The fluorescent layer 32 may be formed from a layer-shaped fluorescent substance, and absorbs a part of the excitation light and emits light with a predetermined wavelength when the excitation light is incident thereto. In addition, the fluorescent layer 32 transmits a part of the remaining excitation light that is not absorbed and diffuses (reflects) the remainder thereof. In addition, an excitation light component reflected from the fluorescent layer 32 becomes non-polarized light.

In this embodiment, a part of the excitation reflected from the reflective film 31 and the fluorescent layer 32 and the emission light at the fluorescent layer 32 are multiplexed and white light is generated, such that the fluorescent layer 32 may be formed from, for example, a YAG (Yttrium Aluminum Garnet)-based fluorescent material or the like. In this case, the fluorescent layer 32 emits light (yellow light) with a wavelength band of 480 to 680 nm when blue excitation light is incident thereto.

In addition, as the fluorescent layer 32, a film of any configuration and material may be used as long as the film can emit light with a wavelength band including blue light and green light, and it is preferable that a film formed from a YAG-based fluorescent material is used, from the view point of light-emitting efficiency and heat resistance.

The fluorescent layer 32 is formed by applying a predetermined fluorescent agent obtained by mixing a fluorescent material and a binder on the reflective film 31. In the example shown in FIGS. 2A to 2C, the fluorescent layer is formed so as to cover the entire surface of the reflective film 31, such that the surface shape of the fluorescent layer 32 become a doughnut shape. In addition, the fluorescent layer 32 may be formed only at a region where the excitation light is emitted thereto, such that the shape of the fluorescent layer 32 is not limited to the example shown in FIGS. 2A to 2C, and a width of the fluorescent layer in a radial direction may be narrower than that of the reflective film 31.

In addition, in regard to the fluorescent layer 32, the light emission amount, and the ratio of the transmission amount to the reflection amount (diffusion amount) of the excitation light may be adjusted by the thickness of the fluorescent layer 32, the density (contained amount) of the fluorescent substance, or the like. Therefore, in this embodiment, the thickness of the fluorescent layer 32, the density of the fluorescent substance, or the like is adjusted so that the emitted light from the light source device section 1 becomes white light.

In addition, in the fluorescent member 15 of the above-described embodiment, an example where the layer-shaped fluorescent substance (fluorescent layer 32) is formed on the substrate 30 via the reflective film 31 is described, but the invention is not limited thereto. For example, in a case where the fluorescent substance is configured by a plate-shaped member having a sufficient strength, the substrate 30 may be not provided. In addition, in this case, the reflective film 31 may be directly formed on one surface of the fluorescent substance formed from a plate-shaped member, or a reflective mirror is prepared separately from the fluorescent substance and the reflective mirror may be used instead of the reflective film 31.

4. CONFIGURATION OF POLARIZATION BEAM SPLITTER

In the light source device section 1 of this embodiment, as shown in FIG. 1, an optical path of the excitation light incident to the fluorescent member 15 from the excitation light source 11 via the polarization beam splitter 12, and an optical path of the multiplexed light incident to the optical engine section 2 from the fluorescent member 15 are overlapped with each other. Therefore, in this embodiment, as described above, a spectral characteristic of the polarization beam splitter 12 is appropriately adjusted to separate both light beams.

Figure 4:
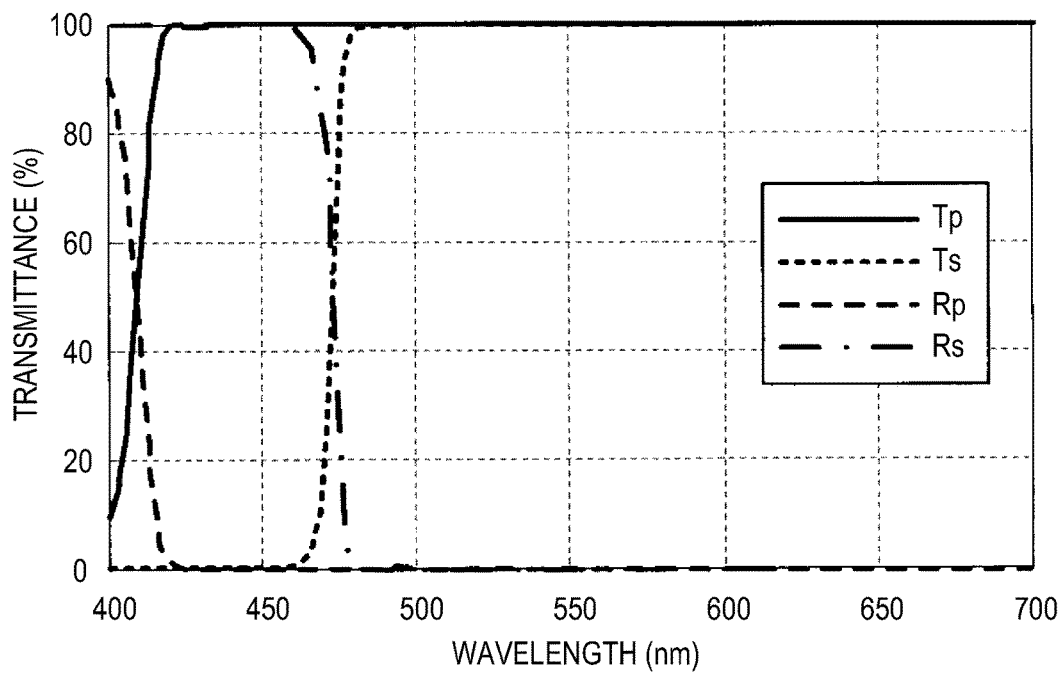
FIG. 4 is a view illustrating a spectral characteristic example of a polarization beam splitter used in a light source device section according to an embodiment of the invention.

FIG. 4 shows a view illustrating a spectral characteristic example of the polarization beam splitter 12 used in this embodiment. In addition, in the spectral characteristic shown in FIG. 4, a horizontal axis represents a wavelength, and a vertical axis represents a transmittance. In addition, a characteristic Tp depicted by a solid line in FIG. 4 represents a transmittance characteristic of the polarization beam splitter 12 with respect to P-polarized incident light, and a characteristic Rp depicted by a broken line represents a reflectance characteristic of the polarization beam splitter 12 with respect to P-polarized incident light. In addition, a characteristic Ts depicted by dotted line in FIG. 4 represents a transmittance characteristic of the polarization beam splitter 12 with respect to S-polarized incident light, and a characteristic Rs depicted by one-dotted line represents a reflectance characteristic of the polarization beam splitter 12 with respect to S-polarized incident light.

In the polarization beam splitter 12 used in this embodiment, as shown in FIG. 4, in regard to an optical component with a wavelength band of 480 to 680 nm that is emitted from the fluorescent layer 32, the transmittance is approximately 100% and the reflectance is approximately 0%, regardless of a polarization direction. That is, all of the light (yellow light) with a wavelength band of 480 to 680 nm is transmitted through the polarization beam splitter 12.

On the other hand, as shown in FIG. 4, the transmittance of the polarization beam splitter 12 with respect to the P-polarized blue light is approximately 100% and the reflectance is approximately 0%. In addition, the transmittance of the polarization beam splitter 12 with respect to the S-polarized blue light is approximately 0% and the reflectance is approximately 100%. That is, the polarization beam splitter 12 transmits light when P-polarized blue light is incident thereto, and reflects light when 5-polarized blue light is incident thereto.

By setting the spectral characteristics of the polarization beam splitter 12 to the characteristics shown in FIG. 4, the excitation light incident to the fluorescent member 15 and the emitted light from the fluorescent member 15 can be separated from each other. Specifically, the excitation light Bs (blue light) incident from the excitation light source 11 is S-polarized light, such that it is reflected by the polarization beam splitter 12 and is guided to the fluorescent member 15.

On the other hand, the emission light component included in the multiplexed light emitted from the fluorescent member 15 is an optical component with a wavelength band of 480 to 680 nm, such that it is transmitted through the polarization beam splitter 12. In addition, in the excitation light (blue light) components included in the multiplexed light emitted from the fluorescent member 15, the excitation light component reflected from the reflective film 31 is P-polarized light as described below, such that it is transmitted through the polarization beam splitter 12. In addition, in the excitation light components included in the multiplexed light emitted from the fluorescent member 15, the excitation light component directly reflected from fluorescent layer 32 is non-polarized light, such that approximately half of the excitation light component is transmitted through the polarization beam splitter 12. That is, a part of the multiplexed light emitted from the fluorescent member 15 is transmitted through polarization beam splitter 12 and the transmitted multiplexed light is guided as white light LW to the spectral optical system 20 in the optical engine section 2.

5. OPERATION EXAMPLE OF LIGHT SOURCE DEVICE SECTION

Figure 5:
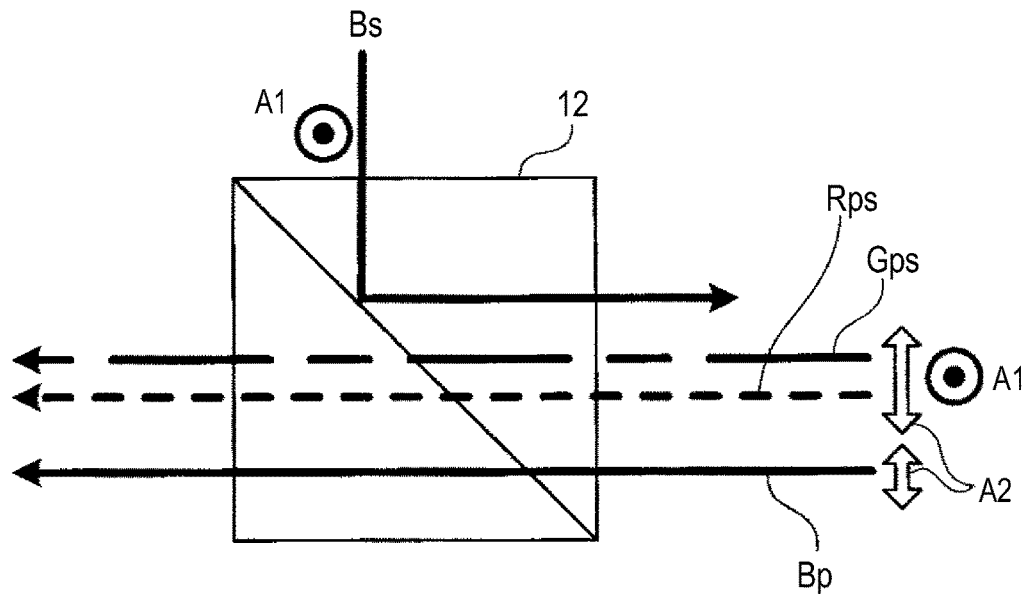
FIG. 5 is a view illustrating an operation of the polarization beam splitter.

Next, an operation example of a light source device section of this embodiment will be described in detail with reference to FIGS. 1 to 5. In addition, FIG. 5 shows a view illustrating a state of an operation of the polarization beam splitter 12 of this embodiment. In FIG. 5, the circle A1 represents an S-polarization direction and the white arrow A2 represents a P-polarization direction. In addition, in FIG. 5, for simplicity of description, a non-polarized excitation light component directly reflected from the fluorescent layer 32 is not shown.

First, the excitation light source 11 emits S-polarized excitation light Bs (blue light) to the polarization beam splitter 12. Subsequently, the polarization beam splitter 12 reflects the incident excitation light Bs in a direction facing the fluorescent member 15. Subsequently, the polarization beam splitter 12 emits the reflected excitation light to the condensing optical system 14 via the quarter wavelength plate 13. Subsequently, the condensing optical system 14 condenses the incident excitation light to have a predetermined spot diameter and emits the condensed light to the fluorescent member 15.

Subsequently, when the excitation light is emitted to the fluorescent layer 32 of the fluorescent member 15, the fluorescent layer 32 absorbs a part of the excited light and thereby emits light (yellow light) with a wavelength band of 480 to 680 nm including red light and green light. In addition, at this time, the fluorescent layer 32 diffuses a part of the excitation light that is not absorbed at the fluorescent layer 32 side and reflects it to the condensing optical system 14 side, and transmits a part of the remaining excitation light that is not absorbed and guides it the reflective film 31. The reflective film 31 reflects the excitation light that is transmitted through the fluorescent layer 32 to the condensing optical system 14 side. In addition, at this time, a part of the emission light of the fluorescent layer 32 is reflected from the reflective film 31 to the condensing optical system 14 side.

As a result, the emission light from the fluorescent layer 32 and a part of the excitation light reflected from the fluorescent layer 32 and reflective film 31 are multiplexed in the fluorescent member 15, and the multiplexed light is emitted from the fluorescent member 15 to the condensing optical system 14.

Subsequently, the condensing optical system 14 converts the multiplexed light emitted from the fluorescent member 15 into parallel light and emits the parallel light to the polarization beam splitter 12 via the quarter wavelength plate 13.

At this time, a light component included in the multiplexed light that passes through the quarter wavelength plate 13, that is, a red light component Rps (broken line arrow in FIG. 5) and a green light component Gps (one-dotted line arrow) are non-polarized light (including a P-polarized component and a S-Polarized light component). Therefore, the red light component Rps and green light component Gps included in the multiplexed light transmit through the quarter wavelength plate 13 "as is" and are incident to the polarization beam splitter 12.

On the other hand, in the excitation light component (blue light component) included in the multiplexed light, the excitation light component reflected from the reflective film 31 passes through the quarter wavelength plate 13 a total of two times until it is incident to the polarization beam splitter 12. Specifically, the excitation light component reflected from the reflective film 31 passes through, respectively, the quarter wavelength plate 13 in an optical path from the excitation light source 11 to the fluorescent member 15 and the optical path from the fluorescent member 15 to the polarization beam splitter 12 one at a time. Therefore, a polarization direction of the reflected light component from the reflective film 31, which is included in the multiplexed light after passing through the quarter wavelength plate 13, is rotated by 90° with respect to the excitation light Bs emitted from the excitation light source 11.

In this embodiment, the excitation light Bs emitted from the excitation light source 11 is S-polarized light, such that the excitation light component Bp (blue light) incident to the polarization beam splitter 12 after being reflected from the reflective film 31 becomes P-polarized light as shown in FIG. 5. On the other hand, since the excitation light component (not shown in FIG. 5) directly reflected from the fluorescent layer 32 is non-polarized light, it passes through the quarter wavelength plate 13 "as is", and is incident to the polarization beam splitter 12 (not shown in FIG. 5).

In addition, in this embodiment, the polarization beam splitter 12 is made to have a spectral characteristic as shown in FIG. 4, such that the polarization beam splitter 12 passes the red light component Rps and the green light component Gps included in the multiplexed light "as is".

In addition, in the excitation light components incident to the polarization beam splitter 12, the reflected light component (Bp) from the reflective film 31 is P-polarized light, such that the polarization beam splitter 12 passes the reflected light component (Bp) from the reflective film 31 "as is". Therefore, in the excitation light components incident to the polarization beam splitter 12, the reflected light component from the fluorescent layer 32 is non-polarized light, such that the polarization beam splitter 12 passes only the P-polarized light in the reflected light components. At this time, in the excitation light components reflected from the fluorescent layer 32, the ratio of component passing through the polarization beam splitter 12 is approximately 50%. Therefore, in this embodiment, in the excitation light component emitted from the fluorescent member 15, an excitation light component of approximately 70 to 80% passes through the polarization beam splitter 12.

As a result, light obtained by multiplexing the red light component Rps, the green light component Gps, and a part of excitation light component (blue light component) reflected from the reflective film 31 and the fluorescent layer 32, that is, white light LW is emitted from a light emitting surface, which is located at the optical engine section 2 side, of the polarization beam splitter 12. In this embodiment, the white light LW is emitted from the light source device section 1 as described above.

In regard to the light source device section 1 having the above-described configuration of this embodiment, the present inventor set parameters of each portion of the light source device section 1 as described below and examined spectral characteristics of emitted light from the light source device section 1.

Wavelength of the excitation light source 11 (blue laser): 445 nm

Condensing diameter of excitation light: 1 mm

Incidence angle $\theta$ of excitation light: 20° or less

Spectral characteristics of the polarization beam splitter 12: a characteristic shown in FIG. 4

Figure 6:
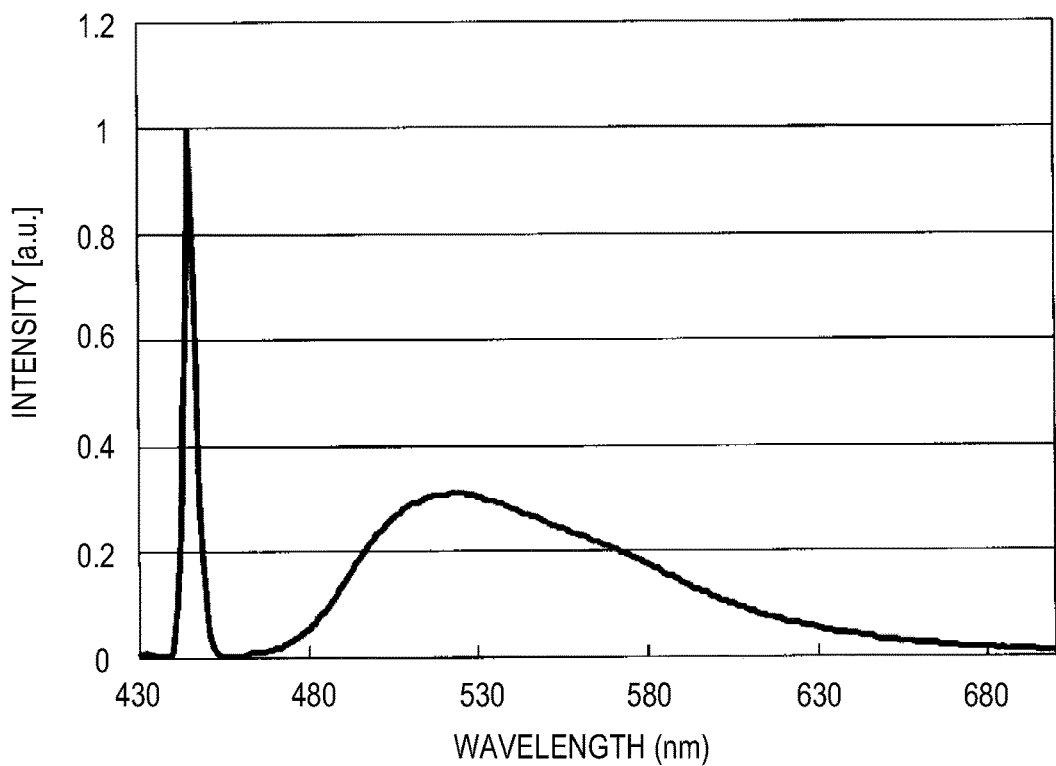
FIG. 6 is a view illustrating a spectral characteristic of emitted light of the light source device section (illumination device) according to an embodiment of the invention.

Distance between the condensing optical system 14 and the fluorescent layer 32: 1 mm or less Number of rotations of the fluorescent member 15: 3000 rpm Forming material of the fluorescent layer 32: A YAG-based fluorescent substance Thickness of the fluorescent layer 32: 50 μm Width of the fluorescent layer 32: 5 mm FIG. 6 shows a spectral characteristic of an emitted light from the light source device section 1, which is obtained under the above-described condition. In addition, in the characteristic shown in FIG. 6, a horizontal axis represents a wavelength, and a vertical axis represents intensity (any unit) of the emitted light. As can be seen from FIG. 6, under the conditions, it can be seen that a light component (blue light component) near a wavelength of 445 nm and a light component with a wavelength ranging from approximately 480 to 680 nm, that is, a light component including a red light component and a green light component are included in the emitted light. From this, it can be seen that white light is emitted from the light source device section 1 of this embodiment.

As described above, it is possible to emit the white light from light source device section 1 by using a solid-state light emitting device. Therefore, this embodiment may be applied for application where a light source device emitting white light is necessary, for example, like in a 3 LCD type projector. That is, in this embodiment, it is possible to provide a mercury-free light source device section (illumination device), which can be applied for various applications, and an image display apparatus 10 having the same.

In the light source device section 1 of this embodiment, it is not necessary to use a mercury lamp, such that it is possible to cope with a recent environmental problem. In addition, according to this embodiment, it is possible to provide a light source device section 1 of which durability is longer and decrease in brightness is also lower compared to the mercury lamp, and an image display apparatus 10. In addition, like in this embodiment, when a solid-state light emitting device is used in the excitation light source device section 11, a lighting time may be shortened compared to the mercury lamp.

In addition, in a case where a semiconductor laser is used as the excitation light source 11 like in the light source device section 1 of this embodiment, light with a sufficiently high brightness may be emitted compared to a solid-state light source such as an LED (Light Emitting Diode) and thereby it is possible to realize a high brightness light source. In addition, like in this embodiment, a configuration where the fluorescent layer 32 is made to emit light by using a blue light laser to generate white light is simpler and cheaper than a configuration where solid-state light sources for red light, green light, and blue light are separately prepared to generate white light.

6. VARIOUS MODIFIED EXAMPLES (1) Modified Example 1

In this embodiment, there is described an example where excitation light incident to the fluorescent member 15 and white light are separated by using the polarization beam splitter 12, but the invention is not limited thereto. For example, a reflective mirror, which is configured to reflect blue light at some regions, may be used instead of the polarization beam splitter 12. An example thereof (modified example 1) is shown in FIG. 7.

A reflective mirror 40 (spectral optical system) of modified example 1 includes a plate-shaped transparent substrate 41 (base) and a reflective film 42 (second reflective film) that is formed one surface of the transparent substrate 41. The reflective film 42 is formed with a size approximately equal to the spot diameter of excitation light. In addition, in this example, the reflective film 42 is disposed at an irradiation position of the excitation light and the reflective mirror 40 is disposed inside of the light source device section 1 in a manner that a surface of the reflective mirror 40 is slanted approximately 45° with respect to an incidence direction of excitation light.

The transparent substrate 41 is formed from, for example, a glass or a transparent material such as a transparent resin, and the reflective film 42 may be configured by, for example, a dichroic mirror (dichroic film) shown in FIG. 3. In a case where the reflective film 42 is configured by the dichroic mirror, by adjusting a forming material of each dielectric layer and a thickness of the dielectric layer and a lamination count, or the like, it is possible to selectively reflect blue light and transmit another wavelength component. In addition, the reflective film 42 may be formed from a metal film such as aluminum.

Figure 7:
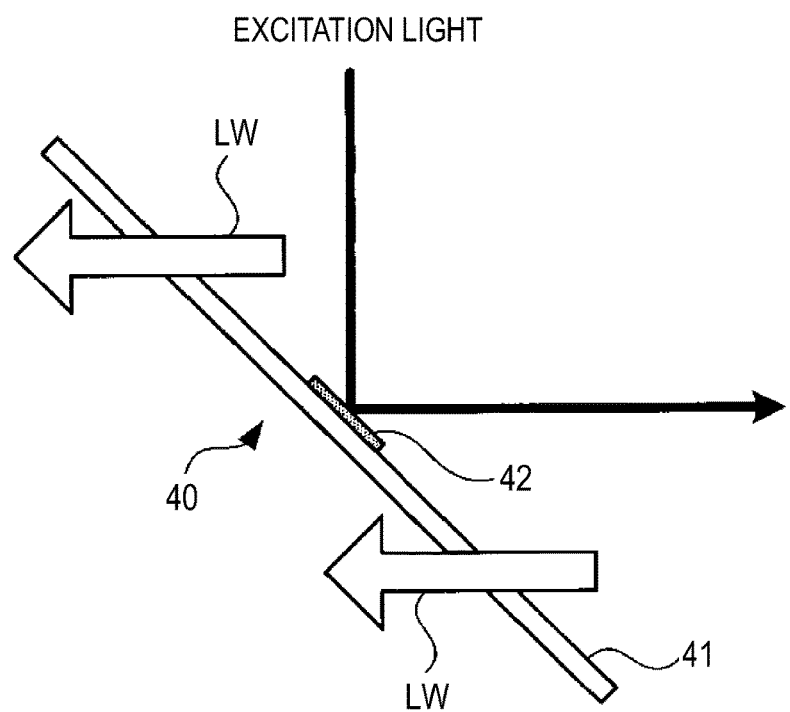
FIG. 7 is a view illustrating a configuration example of a spectral optical system according a modified example 1.

In a case where the reflective mirror 40 having a configuration shown in FIG. 7 is used, excitation light from the excitation light source 11 is reflected from the reflective film 42 and is incident to the fluorescent member 15. On the other hand, multiplexed light (white light LW), which is incident to the reflective mirror 40 from the fluorescent member 15 via condensing optical system 14, mainly passes through a region where the reflective film 42 is not formed and is incident to the optical engine section 2. In addition, in a case where the reflective film 42 is designed to transmit light with a wavelength band other than blue light, red light component and green light component included in the multiplexed light (white light LW) also pass through the region where the reflective film 42 is formed.

In this example, in a case where a semiconductor laser is used as the excitation light source 11, the spot diameter of excitation light emitted from the excitation light source 11 is sufficiently smaller than that of each multiplexed light (white light LW) emitted from the condensing optical system 14. Therefore, it is also possible to emit white light LW with a sufficiently large strength from the light source device section 1 in the configuration of this example.

In addition, like in this example, in a case where the reflective mirror 40 is used as a spectral optical system for separating the excitation light incident to the fluorescent member 15 and the multiplexed light incident to the optical engine section 2, it is possible to make the configuration of the spectral optical system simpler. In the configuration of this example, since it is not necessary to consider a polarization direction of light incident to reflective mirror 40, it is not necessary to provide the quarter wavelength plate 13 like in the embodiment. Therefore, in this example, it is possible to make the configuration of the light source device section 1 simple and it is possible to provide a cheap light source device section 1.

(2) Modified Example 2

In the embodiment and modified example 1, there is described an example where the spectral optical system (polarization beam splitter 12 or reflective mirror 40) reflects the excitation light emitted from the excitation light source 11 and transmits the multiplexed light emitted from the fluorescent member 15. However, the invention is not limited thereto.

For example, the spectral optical system may be configured to transmit the excitation light emitted from the excitation light source 11, guide it the fluorescent member 15, reflect the multiplexed light emitted from the fluorescent member 15 and guide it the optical engine section 2. In addition, in this case, the excitation light incident to the polarization beam splitter 12 from the excitation light source 11 is set as P-polarized light.

(3) Modified Example 3

In the embodiment, there is described an example where the quarter wavelength plate 13 is provided in the light source device section 1, but the invention is not limited thereto. For example, in a usage where white light with a high output is not necessary, the quarter wavelength plate 13 may be not provided.

In a case where the quarter wavelength plate 13 is not provided, the S-polarized excitation light is directly incident to the fluorescent layer 32 via the polarization beam splitter 12 and the condensing optical system 14. In this case, a part of the excitation light incident to the fluorescent layer 32 diffuses in the fluorescent layer 32 and a non-polarized excitation light component is reflected to the condensing optical system 14. In the excitation light components reflected from the fluorescent layer 32, only P-polarized light component is transmitted through the polarization beam splitter 12. In addition, the excitation light component reflected from the reflective film 31 is S-polarized light, the excitation light component does not transmit through the polarization beam splitter 12. Therefore, in the configuration of this example, white light including the P-polarized light component of the excitation light reflected from the fluorescent layer 32 and emission light from the fluorescent layer 32 is emitted from the light source device section 1.

In addition, in the configuration of this example, the excitation light component included in the white light (multiplexed light) emitted from the light source device section 1 includes only the P-polarized light component reflected from the fluorescent layer 32. Therefore, in this example, the intensity of the emitted light and the usage efficiency of excitation light decrease compared to the embodiment. However, in the light source device section 1 of this example, it is not necessary to provide the quarter wavelength plate 13, such that the configuration thereof becomes relatively simple compared to the embodiment.

(4) Modified Example 4

In the embodiment and the modified example 1, there is described an example where the excitation light incident to the fluorescent member 15 and the multiplexed light emitted from the fluorescent member 15 are separated by using the spectral optical system (the polarization beam splitter 12 or the reflective mirror 40), but the invention is not limited thereto. For example, in a case where the excitation light is incident obliquely with respect to the fluorescent member 15 and the multiplexed light emitted from the fluorescent member 15 is condensed in an optical path different from that of the excitation light, the above-described spectral optical system and quarter wavelength plate 13 may be not provided. In this case, the configuration of the light source device section 1 becomes relatively simple.

(5) Modified Example 5

In the embodiment, there is described an example where the condensing optical system 14 is provided in the light source device section 1, but the invention is not limited thereto. For example, in a case where the light source device section 1 of the embodiment is applied for a usage where white light with a high output is not necessary, the light source device section 1 may be configured so as not to include the condensing optical system 14.

(6) Modified Example 6

In the embodiment, there is described an example where the emitted light of the light source device section 1 (illumination device) is set as white light, but the invention is not limited thereto. For example, as the emitted light, blue light may be used for a usage where cyan light (or magenta light) is necessary as the excitation light, or the fluorescent layer 32 may be formed by a fluorescent material that emits only green light (or red light). That is, according to a necessary wavelength (color) of the emitted light, a combination of the wavelength of the excitation light and the material for forming the fluorescent layer 32 may be appropriately selected. In this case, an applicable usage range may be more extendable.

It should be understood by those skilled in the art that various modifications, combinations, sub-combinations and alterations may occur depending on design requirements and other factors insofar as they are within the scope of the appended claims or the equivalents thereof.

What is claimed is:
1. A light source system comprising:
an excitation light source configured to emit excitation light via a excitation light path, the excitation light having a first wavelength range;
a fluorescent portion configured to include
a fluorescent substance that, responsive to an irradiation of the excitation light, emits emission light having a second wavelength range which is different from the first wavelength range, and
a reflective portion that is provided at a side of the fluorescent substance, which is opposite to an excitation light incidence side, and reflects at least one of the excitation light and the emission light emitted from the fluorescent substance; and
a polarization beam splitter that is provided in the excitation light path,
wherein the polarization beam splitter is configured to reflect first polarized light in the first wavelength range,
transmit second polarized light in the first wavelength range, and
transmit third polarized light in the second wavelength range and fourth polarized light in the second wavelength range.

2. The light source system of claim 1, wherein the polarization beam splitter is configured to reflect a first polarized light component in the excitation light emitted from the excitation light source.

3. The light source system of claim 2, wherein the polarization beam splitter is configured to guide the first polarized light component in the excitation light in a direction of the fluorescent portion.

4. The light source system of claim 1, wherein the polarization beam splitter is configured to transmit a first polarized light component and a second polarized light component in the emission light emitted from the fluorescent substance.

5. The light source system of claim 1, further comprising:
a quarter wavelength plate configured to convert the first polarized light in the first wavelength range into the second polarized light in the first wavelength range by passing light having the first wavelength range through the quarter wavelength plate two times.

6. The light source system of claim 5, wherein the quarter wavelength plate is provided adjacent to the polarization beam splitter.

7. The light source system of claim 5, wherein the quarter wavelength plate is configured to pass the excitation light from the polarization beam splitter.

8. The light source system of claim 7, wherein the quarter wavelength plate is configured to pass the excitation light from the polarization beam splitter two times.

9. The light source system of claim 1, wherein the polarization beam splitter is disposed at an intersection of a first direction to which the excitation light source emits the excitation light and a second direction to which the fluorescent portion emits the emission light.

10. The light source system of claim 9, wherein the second direction is perpendicular to the first direction.

11. The light source system of claim 1, wherein the first polarized light is one of S-polarized light and P-polarized light, and
the second polarized light is the other of the S-polarized light and the P-polarized light.

12. The light source system of claim 1, wherein the excitation light is linearly polarized light.

13. The light source system of claim 12, wherein the linearly polarized light is aligned in a first polarization direction.

14. The light source system of claim 1, wherein the fluorescent substance is formed along a circumference of a substrate.

15. The light source system of claim 14, wherein the fluorescent substance is formed continuously along the circumference of the substrate.

16. The light source system of claim 1, wherein the fluorescent substance is formed continuously along a circumferential direction.

17. The light source system of claim 1, wherein the fluorescent substance is formed on the reflective portion.

18. The light source system of claim 17, wherein the fluorescent substance is provided continuously along an entirety of a circumference of the reflective portion.

19. The light source system of claim 1, wherein the first wavelength range is in at least a blue spectrum and the second wavelength range is in at least a red spectrum and a green spectrum.

20. The light source system of claim 1, wherein the fluorescent portion is a rotating fluorescent portion.

21. The light source system of claim 20, further comprising a driving unit configured to change an irradiation position of the excitation light in the rotating fluorescent portion with passage of time.

22. The light source system of claim 1, wherein the reflective portion comprises a reflective film which reflects the excitation light and guides the excitation light to the fluorescent substance.

23. The light source system of claim 1, further comprising: an optical system configured to convert the emission light from the fluorescent substance into parallel light.

24. The light source system of claim 23, wherein the optical system is configured to condense the excitation light and emit the condensed excitation light onto the fluorescent portion.

25. The light source system of claim 1, wherein the first wavelength range includes at least a wavelength of 445 nm and the second wavelength range includes at least a wavelength band of 480 to 680 nm.

26. The light source system of claim 1, wherein the fluorescent substance is formed only from Yttrium Aluminum Garnet-based fluorescent material.

27. The light source system of claim 1, wherein a shape of the fluorescent substance is a doughnut shape.

28. The light source system of claim 1, wherein the fluorescent substance is formed from a single fluorescent material.

29. A light source apparatus comprising:
an excitation light source configured to emit excitation light via a excitation light path, the excitation light having a first colored light;
a fluorescent portion configured to include
a fluorescent substance that, responsive to an irradiation of the excitation light, emits emission light having a second colored light which is different from the first colored light, and
a reflective portion that is provided at a side of the fluorescent substance, which is opposite to an excitation light incidence side, and reflects at least one of the excitation light and the emission light emitted from the fluorescent substance; and
a polarization beam splitter that is provided in the excitation light path,
wherein the polarization beam splitter is configured to
reflect first polarized light in the first colored light,
transmit second polarized light in the first colored light, and
transmit third polarized light in the second colored light and fourth polarized light in the second colored light,
in which the first polarized light and the third polarized light are one of S-polarized light and P-polarized light, and
in which the second polarized light and the fourth polarized light are the other of the S-polarized light and the P-polarized light.

30. A projector comprising:
a light source device section; an image projection section configured to generate an image light by using light emitted from the light source device section and project the generated image light,
wherein the light source device section includes:
an excitation light source configured to emit excitation light via a excitation light path, the excitation light having a first wavelength range;
a fluorescent portion configured to include
a fluorescent substance that, responsive to an irradiation of the excitation light, emits emission light having a second wavelength range which is different from the first wavelength range, and
a reflective portion that is provided at a side of the fluorescent substance, which is opposite to an excitation light incidence side, and reflects at least one of the excitation light and the emission light emitted from the fluorescent substance; and
a polarization beam splitter that is provided in the excitation light path,
wherein the polarization beam splitter is configured to
reflect one of S-polarized light and P-polarized light in the first wavelength range,
transmit the other of the S-polarized light and the P-polarized light in the first wavelength range, and
transmit S-polarized light in the second wavelength range and P-polarized light in the second wavelength range.

* * * * *